United States Patent
Yu et al.

(10) Patent No.: US 11,506,174 B2
(45) Date of Patent: Nov. 22, 2022

(54) POWER CONTROL METHOD AND APPARATUS FOR WIND POWER GENERATOR

(71) Applicant: BEIJING GOLDWIND SCIENCE & CREATION WINDPOWER EQUIPMENT CO., LTD., Beijing (CN)

(72) Inventors: Mengting Yu, Beijing (CN); Pengfei Zhang, Beijing (CN); Guilin Zhou, Beijing (CN); Minghui Wang, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 0 days.

(21) Appl. No.: 16/763,224

(22) PCT Filed: Jul. 13, 2018

(86) PCT No.: PCT/CN2018/095609
§ 371 (c)(1),
(2) Date: May 11, 2020

(87) PCT Pub. No.: WO2019/148775
PCT Pub. Date: Aug. 8, 2019

(65) Prior Publication Data
US 2020/0347824 A1    Nov. 5, 2020

(30) Foreign Application Priority Data
Jan. 31, 2018  (CN) .......................... 201810097438.4

(51) Int. Cl.
*F03D 9/00* (2016.01)
*H02P 9/04* (2006.01)
(Continued)

(52) U.S. Cl.
CPC ........... *F03D 7/0292* (2013.01); *F03D 7/045* (2013.01); *F05B 2260/821* (2013.01);
(Continued)

(58) Field of Classification Search
CPC .. F03D 7/0292; F03D 7/045; F05B 2260/821; F05B 2270/1033;
(Continued)

(56) References Cited

U.S. PATENT DOCUMENTS 9,018,782 B2 * 4/2015 Couchman ................ H02P 9/02
290/44
9,035,479 B1 * 5/2015 Gates ..................... G06Q 50/06
290/43
(Continued)

FOREIGN PATENT DOCUMENTS

CN   102072085 A   5/2011
CN   102782318 A   11/2012
(Continued)

OTHER PUBLICATIONS

International Search Report and Written Opinion in corresponding PCT Application No. PCT/CN2018/095609, dated Oct. 12, 2018, 9 pages.
(Continued)

*Primary Examiner* — Tulsidas C Patel
*Assistant Examiner* — Thomas K Quigley
(74) *Attorney, Agent, or Firm* — Bayes PLLC

(57) ABSTRACT

A power control method and apparatus for a wind power generator. The power control method comprises: predicting, according to historical wind resource data, wind resource data within a predetermined future time period (S10); estimating, according to the remaining design lifetime of a wind power generator, the maximum design lifetime allowed to be consumed within the predetermined future time period
(Continued)

(S20); determining, according to the predicted wind resource data and the estimated maximum design lifetime, optimal output powers of the wind power generator in respective wind velocity ranges within the predetermined future time period (S30); and controlling operation of the wind power generator according to the determined optimal output powers of the wind power generator in the respective wind velocity ranges within the predetermined future time period (S40).

13 Claims, 2 Drawing Sheets

(51) Int. Cl.
  *F03D 7/02* (2006.01)
  *F03D 7/04* (2006.01)
(52) U.S. Cl.
  CPC . *F05B 2270/109* (2013.01); *F05B 2270/1033* (2013.01); *F05B 2270/32* (2013.01); *F05B 2270/321* (2013.01); *F05B 2270/404* (2013.01)
(58) Field of Classification Search
  CPC ............ F05B 2270/109; F05B 2270/32; F05B 2270/321; F05B 2270/404
  See application file for complete search history.

(56) References Cited

U.S. PATENT DOCUMENTS

| | | | |
|---|---|---|---|
| 9,097,236 B2 | 8/2015 | Zhou et al. | |
| 9,201,410 B2* | 12/2015 | Ambekar | G05B 13/04 |
| 9,599,096 B2* | 3/2017 | Spruce | F03D 7/028 |
| 9,835,135 B2 | 12/2017 | Draper | |
| 10,422,319 B2* | 9/2019 | Spruce | F03D 7/0292 |
| 10,871,146 B2* | 12/2020 | Spruce | F03D 7/0292 |
| 10,927,814 B2* | 2/2021 | Spruce | F03D 7/028 |
| 10,975,843 B2* | 4/2021 | Spruce | F03D 7/0292 |
| 11,041,483 B2* | 6/2021 | Tomas | F03D 7/02 |
| 2008/0086281 A1 | 4/2008 | Santos | |
| 2011/0123331 A1 | 5/2011 | Stiesdal | |
| 2013/0035798 A1 | 2/2013 | Zhou et al. | |
| 2013/0166082 A1* | 6/2013 | Ambekar | F03D 7/028 700/287 |
| 2013/0257051 A1* | 10/2013 | Spruce | F03D 7/048 290/44 |
| 2013/0270827 A1* | 10/2013 | Couchman | F03D 7/028 290/44 |
| 2013/0320674 A1* | 12/2013 | Ingram | H02P 9/04 290/43 |
| 2014/0288855 A1 | 9/2014 | Deshpande | |
| 2015/0003983 A1 | 1/2015 | Coultate | |
| 2015/0167637 A1* | 6/2015 | Kooijman | F03D 7/0292 416/1 |
| 2018/0156197 A1* | 6/2018 | Spruce | F03D 7/048 |
| 2018/0171979 A1* | 6/2018 | Spruce | F03D 80/50 |
| 2018/0180025 A1* | 6/2018 | Spruce | F03D 7/0292 |
| 2018/0187648 A1* | 7/2018 | Spruce | F03D 7/048 |
| 2018/0223808 A1* | 8/2018 | Spruce | F03D 7/0292 |
| 2019/0178231 A1* | 6/2019 | Tomas | F03D 7/02 |

FOREIGN PATENT DOCUMENTS

| | | |
|---|---|---|
| CN | 103186818 A | 7/2013 |
| CN | 105844361 A | 8/2016 |
| CN | 107194097 A | 9/2017 |
| EP | 2302208 A1 | 3/2011 |
| EP | 3093486 A1 | 11/2016 |
| WO | 2017000955 A1 | 1/2017 |

OTHER PUBLICATIONS

First Examination Report in corresponding Australian Application No. 2018406114 dated Feb. 9, 2021 (5 pages).
Supplemental European Search Report in corresponding European Application No. 18903654 dated Feb. 25, 2021 (32 pages).
First Office action issued in counterpart Chinese Application No. 201810097438.4, dated Apr. 3, 2019, 9 pages.
First Office action issued in counterpart Indian Application No. 202017016646, dated Oct. 28, 2020, 6 pages.

\* cited by examiner

POWER CONTROL METHOD AND APPARATUS FOR WIND POWER GENERATOR

RELATED APPLICATIONS

The present application is a National Phase application of International Application No. PCT/CN2018/095609, filed on Jul. 13, 2018, which claims the benefits of priority to Chinese Patent Application No. 201810097438.4, filed on Jan. 31, 2018. The entire contents of each of the above-identified applications are incorporated herein by reference.

FIELD

The present disclosure relates to the field of control of wind turbines, and in particular to a method and a device for controlling power of a wind turbine.

BACKGROUND

As global energy crisis becomes more apparent, developing renewable energy becomes a major action in energy development strategies of countries around the world. Wind power generation is a widely studied renewable energy source because wind energy has characteristics of huge reserves, renewable, widely distributed and pollution-free in the world.

A wind turbine usually follows the principle of optimizing its power generation capacity under standard wind parameters when determining a power curve during a design phase. During time operation of the wind turbine, power control is generally performed based on the power curve determined at the design phase. However, wind parameters in an actual wind farm are significantly different from the standard wind parameters. Therefore, the existing power control method cannot consider both the safety and economics for wind turbine operation.

SUMMARY

An object of the present disclosure is to provide a method and a device for controlling power of a wind turbine, to solve the problem that the existing power control method cannot consider both the safety and economics for wind turbine operation.

A method for controlling power of a wind turbine is provided according to an aspect of the present disclosure. The method includes: predicting wind resource data in a predetermined future period of time based on historical wind resource data; estimating a maximum design lifetime that the wind turbine is allowed to consume in the predetermined future period of time based on a remaining design lifetime of the wind turbine, where the design lifetime refers to a period of time that the wind turbine operates under a design load; determining optimal output power of the wind turbine in each wind speed section in the predetermined future period of time based on the predicted wind resource data and the estimated maximum design lifetime; and controlling the wind turbine to operate in the predetermined future period of time based on the determined optimal output power of the wind turbine in each wind speed section.

A device for controlling power of a wind turbine is provided according to another aspect of the present disclosure. The device includes a prediction unit, an estimation unit, a determination unit, and a control unit. The prediction unit is configured to predict wind resource data in a predetermined future period of time based on historical wind resource data. The estimation unit is configured to estimate a maximum design lifetime that the wind turbine is allowed to consume in the predetermined future period of time based on a remaining design lifetime of the wind turbine. The design lifetime refers to a period of time that the wind turbine operates under a design load. The determination unit is configured to determine optimal output power of the wind turbine in each wind speed section in the predetermined future period of time based on the predicted wind resource data and the estimated maximum design lifetime. The control unit is configured to control the wind turbine to operate in the predetermined future period of time based on the determined optimal output power of the wind turbine in each wind speed section.

A computer-readable storage medium is provided according to another aspect of the present disclosure. The computer-readable storage medium stores a computer program that, when being executed by a processor, causes the processor to perform the above method for controlling power of a wind turbine.

A computing apparatus is provided according to another aspect of the present disclosure. The computing apparatus includes a processor and a memory. The memory is configured to store a computer program that, when being executed by the processor, causes the processor to perform the method for controlling power of a wind turbine.

With the method and device for controlling power of a wind turbine according to embodiments of the present disclosure, the optimal output power of the wind turbine in each wind speed section is determined by predicting the wind resource data and the consumed design lifetime of the wind turbine, thereby increasing power generation capacity of the wind turbine as much as possible while ensuring safe operation of the wind turbine.

Additional aspects and/or advantages of the present disclosure are partially described in the following description, and some of the aspects and/or advantages are clear from the description, or may be obtained by implementing the present disclosure.

BRIEF DESCRIPTION OF THE DRAWINGS

The above and other objects, features, and advantages of the present disclosure become clearer through the following detailed description in conjunction with the accompanying drawings. In the drawings.

DETAILED DESCRIPTION OF EMBODIMENTS

Hereinafter, embodiments of the present disclosure are described in detail with reference to the accompanying drawings.

Figure 1:
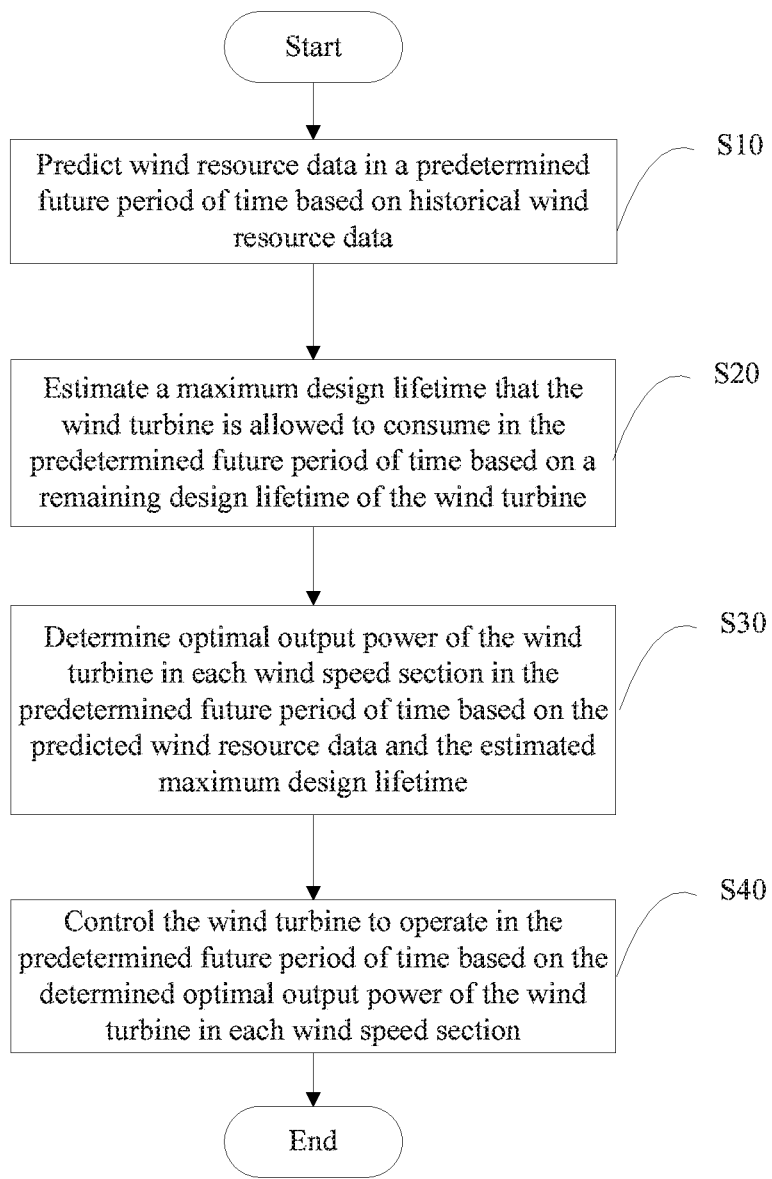
FIG. 1 is a flowchart showing a method for controlling power of a wind turbine according to an embodiment of the present disclosure.

FIG. 1 is a flowchart showing a method for controlling power of a wind turbine according to an embodiment of the present disclosure.

In step S10, wind resource data in a predetermined future period of time is predicted based on historical wind resource data. The wind resource data may include a wind speed. Alternatively, the wind resource data includes a wind speed and at least one of turbulence intensity, wind shear, a wind direction, an inflow inclination angle, wind frequency distribution and air density.

A specific manner of predicting the wind resource data in the predetermined future period of time is not limited in the present disclosure. The wind resource data in the predetermined future period of time may be predicted by using various existing wind resource prediction methods. It is not required to consider different sectors in predicting the wind resource data in the predetermined future period of time.

In step S20, a maximum design lifetime that the wind turbine is allowed to consume in the predetermined future period of time is estimated based on a remaining design lifetime of the wind turbine.

The design lifetime refers to a period of time that the wind turbine operates under a design load.

In an example, the maximum design lifetime that the wind turbine is allowed to consume in the predetermined future period of time is determined based on the remaining design lifetime of the wind turbine, an actually used period of time of the wind turbine, a pre-determined design lifetime of the wind turbine which may be between 20-25 years, and a length of the predetermined future period of time.

It is assumed that the wind turbine consumes the remaining design lifetime evenly in the future usage period of time, a remaining usage period of time of the wind turbine may be determined based on the actually used period of time and the pre-determined design lifetime of the wind turbine. A product of a ratio of the length of the predetermined future period of time to the remaining usage period of time of the wind turbine and the remaining design lifetime of the wind turbine serves as the maximum design lifetime that the wind turbine is allowed to consume in the predetermined future period of time. Here, the remaining usage period of time of the wind turbine may be obtained by subtracting the actually used period of time of the wind turbine from the pre-determined design lifetime.

A specific manner of estimating the maximum design lifetime that is allowed to consume in the predetermined future period of time is not limited in the present disclosure. The maximum design lifetime that is allowed to consume in the predetermined future period of time may be estimated in other manners.

In the present disclosure, in a case that the remaining design lifetime is unknown, the consumed design lifetime of the wind turbine may be determined by performing fatigue load simulation based on historical wind resource data and historical operation data of the wind turbine. The remaining design lifetime is determined based on the pre-determined design lifetime and the consumed design lifetime. The remaining design lifetime may be obtained by subtracting the consumed design lifetime from the pre-determined design lifetime.

The historical operation data may include at least one of fault data, the number of start/stop occurrences, and a duration of an idling state. During a design phase of the wind turbine, values of a fault condition and the number of start/stop occurrences are usually set based on recommendations of the relevant standards in the fatigue load simulation, and the value of the duration of an idling condition is set based on probability density distribution of the wind speed, where actual operation of the wind turbine is not considered. Therefore, when performing fatigue load simulation in the present disclosure, in order to more accurately evaluate the operation state of the wind turbine, in a preferred embodiment the following operation data is required to be counted: fault data, the number of start/stop occurrences, and the duration of the idling state. It should be noted that during the fatigue load simulation in the design phase, only an idling state before a cut-in speed or after a cut-out speed is considered. However, when the wind turbine actually operates on the scene, the wind turbine may be in an idling state in an operation wind speed interval due to sector management or the like. In a preferred embodiment, the idling state in this case is also required to be counted. In a preferred embodiment, historical operating data depends on different sectors.

In an example, the fatigue load simulation may be performed based on the historical wind resource data and the historical operation data of the wind turbine, to obtain an equivalent fatigue load of the wind turbine. Then, the consumed design lifetime is obtained based on the equivalent fatigue load and a correspondence between the equivalent fatigue load and the consumed design lifetime.

Specifically, the fatigue load simulation is performed on the wind turbine based on the historical wind resource data and the historical operation data, to obtain an equivalent fatigue load of each predefined key component of the wind turbine. A consumed design lifetime of each key component is acquired based on the equivalent fatigue load of the key component and a design fatigue load of the key component. The consumed lifetime of the wind turbine is determined based on the consumed design lifetime of each key component. A maximum value of the consumed design lifetime of each key component serves as the consumed lifetime of the wind turbine.

Here, a corresponding fatigue load simulation condition may be formulated based on the historical wind resource data and the historical operation data. Parameters for fatigue load simulation (such as a period of time in which fatigue occurs and the number of times that the fatigue occurs) may be set based on the wind frequency distribution in the historical wind resource data and the historical operation data. An equivalent fatigue load of each key component in each year is determined by the fatigue load simulation. In an example, when the fatigue load simulation is performed on an annual basis, the period of time in which fatigue occurs and the number of times that the fatigue occurs in each sector may be assigned based on the wind frequency distribution. A total period of time in which fatigue occurs is 1 year. The number of times that the fatigue occurs may be set to 500,000. The number of times that the fatigue occurs is not limited in the present disclosure. The number of times that the fatigue occurs may have other values.

An accumulated consumed design lifetime of a key component to an $N^{th}$ year may be determined from the following equation (1).

$$Life_{consume} = \frac{\sum_1^N EQ_n}{EQ_{design}} \quad (1)$$

where $Life_{consume}$ represents an accumulated consumed design lifetime of a key component to an $N^{th}$ year, $EQ_{design}$ represents a design fatigue load of the key component, and $EQ_n$ represents an equivalent fatigue load in the $N^{th}$ year.

In step S30, optimal output power of the wind turbine in each wind speed section in the predetermined future period of time is determined based on the predicted wind resource data and the estimated maximum design lifetime.

Here, in a certain wind condition, the wind turbine bears a large load if the wind turbine outputs great power. Therefore, maximum output power (that is, the optimal output power) allowed for the wind turbine in the predetermined future period of time, in a case that the equivalent load does not exceed an equivalent load corresponding to the maximum design lifetime, may be estimated based on the predicted wind resource data and the consumable maximum design lifetime, so as to take both the safety and economics of operation of the wind turbine into account.

In an example, before determining the optimal output power, a power output range of the wind turbine in each wind speed section may be determined. The optimal output power of the wind turbine in each wind speed section may be determined within the power output range of the wind speed section. Here, the power output range of the wind turbine in each wind speed section may be determined in various existing ways.

Two ways to determine the optimal output power are listed below.

In a first way, the optimal output power is determined by iterative calculation.

Specifically, first, an initial value of set output power of the wind turbine in each wind speed section is set. In order to reduce the number of iterations, the initial value of the set output power of each wind speed section is preferably a maximum value in the power output range of the wind speed section.

Then, a load calculation step is performed. An equivalent load of the wind turbine in the predetermined future period of time is determined based on the predicted wind resource data and the set output power of the wind speed section in which a wind speed in the wind resource data is included. Here, by using various existing load calculation methods, the equivalent load of the wind turbine in the predetermined future period of time is determined based on the predicted wind resource data and the set output power of the wind speed section in which the wind speed in the wind resource data is included.

A design lifetime of the wind turbine in the predetermined future period of time is estimated based on the equivalent load.

It is determinized whether an absolute value of a difference between the estimated design lifetime and the maximum design lifetime is less than a preset value. In a case that the absolute value is less than the preset value, current set output power in each wind speed section serves as optimal output power of the wind turbine in the wind speed section. In a case that the absolute value is not less than the preset value, the set output power is updated, and the method returns to the load calculation step to perform next iteration calculation.

Here, when updating the set output power for the next iterative calculation, the power output range of each wind speed section may be divided into two intervals with rated power as a boundary. The set output power for the next iteration calculation is determined by using a dichotomy method.

In a second way, first, a first equivalent load of the wind turbine in the predetermined future period of time is determined based on the maximum design lifetime. Then, based on the first equivalent load and the predicted wind resource data, optimal output power of the wind turbine in wind speed sections including each wind speed in the wind resource data is determined, to cause an absolute value of a difference between a second equivalent load of the wind turbine in the predetermined future period of time and the first equivalent load is less than a preset value. The second equivalent load is calculated based on the wind resource data and the determined optimal output power. In the second way, the optimal output power of the wind turbine in each wind speed section may be calculated by optimizing. An optimization target is that the absolute value of the difference between the second equivalent load and the first equivalent load of the wind turbine in the predetermined future period of time is less than the preset value.

In step S40, the wind turbine is controlled to operate in the predetermined future period of time based on the determined optimal output power of the wind turbine in each wind speed section.

That is, in the predetermined future period of time, the wind turbine is controlled to output optimal output power of a wind speed section in which an actual wind speed is included. In this way, the wind turbine, when being in a relatively harsh wind resource condition, can sacrifice a certain power generation capability to ensure its safety, and the wind turbine, when being in a better wind resource condition, can increase power generation capacity while ensuring its safety. Specifically, in the predetermined future period of time, the actual wind speed may be detected, the wind speed section in which the actual wind speed is included is determined, and the wind turbine is controlled to output the optimal output power of the wind speed section in which the actual wind speed is included.

Figure 2:
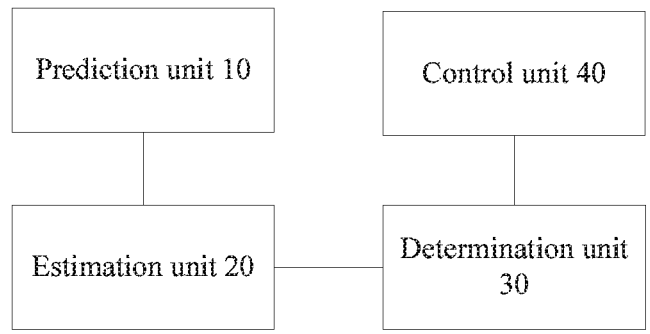
FIG. 2 is a block diagram showing a device for controlling power of a wind turbine according to an embodiment of the present disclosure.

FIG. 2 is a block diagram showing a device for controlling power of a wind turbine according to an embodiment of the present disclosure.

The device for controlling power of a wind turbine according to the embodiment of the present disclosure includes a prediction unit 10, an estimation unit 20, a determination unit 30, and a control unit 40.

The prediction unit 10 is configured to predict wind resource data in a predetermined future period of time based on historical wind resource data. Here, the wind resource data may include a wind speed. Alternatively, the wind resource data includes a wind speed and at least one of turbulence intensity, wind shear, a wind direction, an inflow inclination angle, wind frequency distribution and air density.

A specific manner of predicting the wind resource data in the predetermined future period of time is not limited in the present disclosure. The wind resource data in the predetermined future period of time may be predicted by using various existing wind resource prediction methods. It is not required to consider different sectors in predicting the wind resource data in the predetermined future period of time.

The estimation unit 20 is configured to estimate a maximum design lifetime that the wind turbine is allowed to consume in the predetermined future period of time based on a remaining design lifetime of the wind turbine.

The design lifetime refers to a period of time that the wind turbine operates under a design load.

In an example, the maximum design lifetime that the wind turbine is allowed to consume in the predetermined future period of time is determined based on the remaining design lifetime of the wind turbine, an actually used period of time of the wind turbine, a pre-determined design lifetime of the wind turbine, and a length of the predetermined future period of time.

It is assumed that the wind turbine consumes the remaining design lifetime evenly in the future usage period of time, a remaining usage period of time of the wind turbine may be determined based on the actually used period of time and the pre-determined design lifetime of the wind turbine. A product of a ratio of the length of the predetermined future period of time to the remaining usage period of time of the wind turbine and the remaining design lifetime of the wind turbine serves as the maximum design lifetime that the wind turbine is allowed to consume in the predetermined future period of time. Here, the remaining usage period of time of the wind turbine may be obtained by subtracting the actually used period of time of the wind turbine from the pre-determined design lifetime.

A specific manner of estimating the maximum design lifetime that is allowed to consume in the predetermined future period of time is not limited in the present disclosure. The maximum design lifetime that is allowed to consume in the predetermined future period of time may be estimated in other manners.

In the present disclosure, in the case that the remaining design lifetime is unknown, the consumed design lifetime of the wind turbine may be determined by performing fatigue load simulation based on historical wind resource data and historical operation data of the wind turbine. The remaining design lifetime is determined based on the pre-determined design lifetime and the consumed design lifetime. The remaining design lifetime may be obtained by subtracting the consumed design lifetime from the pre-determined design lifetime.

The historical operation data may include at least one of fault data, the number of start/stop occurrences, and a duration of an idling state. During a design phase of the wind turbine, values of a fault condition and the number of start/stop occurrences are usually set based on recommendations of the relevant standards in the fatigue load simulation, and the value of the duration of an idling condition is set based on probability density distribution of the wind speed, where actual operation of the wind turbine is not considered. Therefore, when performing fatigue load simulation in the present disclosure, in order to more accurately evaluate the operation state of the wind turbine, in a preferred embodiment the following operation data is required to be counted: fault data, the number of start/stop occurrences, and the duration of the idling state. It should be noted that during the fatigue load simulation in the design phase, only an idling state before a cut-in speed or after a cut-out speed is considered. However, when the wind turbine actually operates on the scene, the wind turbine may be in an idling state in an operation wind speed interval due to sector management or the like. In a preferred embodiment, the idling state in this case is also required to be counted. In a preferred embodiment, historical operating data depends on different sectors.

In an example, the fatigue load simulation may be performed based on the historical wind resource data and the historical operation data of the wind turbine, to obtain an equivalent fatigue load of the wind turbine. Then, the consumed design lifetime is obtained based on the equivalent fatigue load and a correspondence between the equivalent fatigue load and the consumed design lifetime.

Specifically, the fatigue load simulation is performed on the wind turbine based on the historical wind resource data and the historical operation data, to obtain an equivalent fatigue load of each predefined key component of the wind turbine. A consumed design lifetime of each key component is acquired based on the equivalent fatigue load of the key component and a design fatigue load of the key component. The consumed lifetime of the wind turbine is determined based on the consumed design lifetime of each key component. A maximum value of the consumed design lifetime of each key component serves as the consumed lifetime of the wind turbine.

Here, a corresponding fatigue load simulation condition may be formulated based on the historical wind resource data and the historical operation data. Parameters for fatigue load simulation (such as a period of time in which fatigue occurs and the number of times that the fatigue occurs) may be set based on the wind frequency distribution in the historical wind resource data and the historical operation data. An equivalent fatigue load of each key component in each year is determined by the fatigue load simulation. In an example, when the fatigue load simulation is performed on an annual basis, the period of time in which fatigue occurs and the number of times that the fatigue occurs in each sector may be assigned based on the wind frequency distribution. A total period of time in which fatigue occurs is 1 year. The number of times that the fatigue occurs may be set to 500,000. The number of times that the fatigue occurs is not limited in the present disclosure. The number of times that the fatigue occurs may have other values.

An accumulated consumed design lifetime of a key component to an Nth year may be determined from the above equation (1).

The determination unit 30 is configured to determine optimal output power of the wind turbine in each wind speed section in the predetermined future period of time based on the predicted wind resource data and the estimated maximum design lifetime.

Here, in a certain wind condition, the wind turbine bears a large load if the wind turbine outputs great power. Therefore, maximum output power (that is, the optimal output power) allowed for the wind turbine in the predetermined future period of time, in a case that the equivalent load does not exceed an equivalent load corresponding to the maximum design lifetime, may be estimated based on the predicted wind resource data and the consumable maximum design lifetime, so as to take both the safety and economics of operation of the wind turbine into account.

In an example, before determining the optimal output power, a power output range of the wind turbine in each wind speed section may be determined. The optimal output power of the wind turbine in each wind speed section may be determined within the power output range of the wind speed section. Here, the power output range of the wind turbine in each wind speed section may be determined in various existing ways.

Two ways to determine the optimal output power are listed below.

In a first way, the optimal output power is determined by iterative calculation.

Specifically, first, an initial value of set output power of the wind turbine in each wind speed section is set. In order to reduce the number of iterations, the initial value of the set output power of each wind speed section is preferably a maximum value in the power output range of the wind speed section.

Then, a load calculation step is performed. An equivalent load of the wind turbine in the predetermined future period of time is determined based on the predicted wind resource data and the set output power of the wind speed section in which a wind speed in the wind resource data is included. Here, by using various existing load calculation methods, the equivalent load of the wind turbine in the predetermined future period of time is determined based on the predicted wind resource data and the set output power of the wind speed section in which a wind speed in the wind resource data is included.

A design lifetime of the wind turbine in the predetermined future period of time is estimated based on the equivalent load.

It is determinized whether an absolute value of a difference between the estimated design lifetime and the maximum design lifetime is less than a preset value. In a case that the absolute value is less than the preset value, current set output power in each wind speed section serves as optimal output power of the wind turbine in the wind speed section. In a case that the absolute value is not less than the preset value, the set output power is updated, and the method returns to the load calculation step to perform next iteration calculation.

Here, when updating the set output power for the next iterative calculation, the power output range of each wind speed section may be divided into two intervals with rated power as a boundary. The set output power for the next iteration calculation is determined by using a dichotomy method.

In a second way, first, a first equivalent load of the wind turbine in the predetermined future period of time is determined based on the maximum design lifetime. Then, based on the first equivalent load and the predicted wind resource data, optimal output power of the wind turbine in wind speed sections including each wind speed in the wind resource data is determined, to cause an absolute value of a difference between a second equivalent load of the wind turbine in the predetermined future period of time and the first equivalent load is less than a preset value. The second equivalent load is calculated based on the wind resource data and the determined optimal output power. In the second way, the optimal output power of the wind turbine in each wind speed section may be calculated by optimizing. An optimization target is that the absolute value of the difference between the second equivalent load and the first equivalent load of the wind turbine in the predetermined future period of time is less than the preset value.

The control unit 40 is configured to control the wind turbine to operate in the predetermined future period of time based on the determined optimal output power of the wind turbine in each wind speed section.

That is, in the predetermined future period of time, the wind turbine is controlled to output optimal output power of a wind speed section in which an actual wind speed is included. In this way, the wind turbine, when being in a relatively harsh wind resource condition, can sacrifice a certain power generation capability to ensure its safety, and the wind turbine, when being in a better wind resource condition, can increase power generation capacity while ensuring its safety. Specifically, in the predetermined future period of time, the actual wind speed may be detected, the wind speed section in which the actual wind speed is included is determined, and the wind turbine is controlled to output the optimal output power of the wind speed section in which the actual wind speed is included.

With the method and device for controlling power of a wind turbine according to embodiments of the present disclosure, the optimal output power of the wind turbine in each wind speed section is determined by predicting the wind resource data and the consumed design lifetime of the wind turbine, thereby increasing power generation capacity of the wind turbine as much as possible while ensuring safe operation of the wind turbine.

A computer-readable storage medium is provided according to an embodiment of the present disclosure. The computer-readable storage medium stores a computer program that, when being executed by a processor, causes the processor to perform the above method for controlling power of a wind turbine.

A computing apparatus is provided according to an embodiment of the present disclosure. The computing apparatus includes a processor and a memory. The memory is configured to store a computer program that, when being executed by the processor, causes the processor to perform the method for controlling power of a wind turbine.

In addition, program modules in the device for controlling power of a wind turbine according to the embodiment of the present disclosure may be completely implemented by hardware, such as a field programmable gate array or an application specific integrated circuit. Alternatively, the program modules in the device for controlling power of a wind turbine according to the embodiment of the present disclosure may be implemented by a combination of hardware and software, or may be implemented entirely in software through computer programs.

The present disclosure is illustrated and described with reference to exemplary embodiments thereof. However, it should be understood by those skilled in the art that various changes in form and detail may be made thereto without departing from the spirit and scope of the present disclosure as defined by the claims.

The invention claimed is:

1. A method for controlling power of a wind turbine, comprising:
   predicting wind resource data in a predetermined future period of time based on historical wind resource data;
   determining a maximum design lifetime that the wind turbine is allowed to consume in the predetermined future period of time based on a remaining design lifetime of the wind turbine, wherein a design lifetime of the wind turbine refers to a lifetime of the wind turbine operating at a design load and the remaining design lifetime refers to a remaining lifetime of the wind turbine when operating at the design load;
   determining optimal output power of the wind turbine in each of a plurality of wind speed ranges in the predetermined future period of time based on the predicted wind resource data and the maximum design lifetime; and
   controlling the wind turbine to operate in the predetermined future period of time based on the optimal output power of the wind turbine in at least one of the plurality of wind speed ranges,
   wherein determining the maximum design lifetime comprises:
      determining a remaining usage period of time of the wind turbine based on an actual usage period of time and the design lifetime of the wind turbine; and
      determining the maximum design lifetime based on a ratio of a duration of the predetermined future period of time to the remaining usage period of time of the wind turbine multiplied by the remaining design lifetime of the wind turbine.

2. The method according to claim 1, further comprising:
   performing a fatigue load simulation on the wind turbine based on the historical wind resource data and historical operation data to obtain an equivalent fatigue load of at least one predefined key component of the wind turbine;
   acquiring a consumed design lifetime of the at least one key component based on the equivalent fatigue load of the at least one key component and a design fatigue load of the at least one key component;

determining a consumed design lifetime of the wind turbine based on the consumed design lifetime of the at least one key component; and determining the remaining design lifetime of the wind turbine based on the design lifetime and the consumed design lifetime of the wind turbine.

3. The method according to claim 1, wherein:

the wind resource data comprise a wind speed; or the wind resource data comprise the wind speed and at least one of turbulence intensity, wind shear, a wind direction, an inflow inclination angle, a wind frequency distribution, or an air density.

4. The method according to claim 1, wherein the optimal output power corresponding to the at least one of the plurality of wind speed ranges is within a power output range of that wind speed range.

5. A device for controlling power of a wind turbine, comprising:

a prediction unit configured to predict wind resource data in a predetermined future period of time based on historical wind resource data;

an estimation unit configured to determine a maximum design lifetime that the wind turbine is allowed to consume in the predetermined future period of time based on a remaining design lifetime of the wind turbine, wherein a design lifetime of the wind turbine refers to a lifetime of the wind turbine operating at a design load and the remaining design lifetime refers to a remaining lifetime of the wind turbine when operating at the design load;

a determination unit configured to determine optimal output power of the wind turbine in each of a plurality of wind speed ranges in the predetermined future period of time based on the predicted wind resource data and the maximum design lifetime; and a control unit configured to control the wind turbine to operate in the predetermined future period of time based on the optimal output power of the wind turbine in at least one of the plurality of wind speed ranges, wherein the estimation unit is configured to:

determine a remaining usage period of time of the wind turbine based on an actual usage period of time and the design lifetime of the wind turbine; and determine the maximum design lifetime based on a ratio of a duration of the predetermined future period of time to the remaining usage period of time of the wind turbine multiplied by the remaining design lifetime of the wind turbine.

6. The device according to claim 5, wherein the estimation unit is configured to:

perform a fatigue load simulation on the wind turbine based on the historical wind resource data and historical operation data to obtain an equivalent fatigue load of at least one predefined key component of the wind turbine;

acquire a consumed design lifetime of at least one key component based on the equivalent fatigue load of the at least one key component and a design fatigue load of the at least one key component;

determine a consumed design lifetime of the wind turbine based on the consumed design lifetime of the at least one key component; and determine the remaining design lifetime of the wind turbine based on the design lifetime and the consumed design lifetime of the wind turbine.

7. A non-transitory computer-readable storage medium storing instructions that, when executed by a processor, causes the processor to perform operations comprising:

predicting wind resource data in a predetermined future period of time based on historical wind resource data;

determining a maximum design lifetime that a wind turbine is allowed to consume in the predetermined future period of time based on a remaining design lifetime of the wind turbine, wherein a design lifetime of the wind turbine refers to a lifetime of the wind turbine operating at a design load and the remaining design lifetime refers to a remaining lifetime of the wind turbine when operating at the design load;

determining optimal output power of the wind turbine in each of a plurality of wind speed ranges in the predetermined future period of time based on the predicted wind resource data and the maximum design lifetime; and controlling the wind turbine to operate in the predetermined future period of time based on the optimal output power of the wind turbine in at least one of the plurality of wind speed ranges, wherein determining the maximum design lifetime comprises:

determining a remaining usage period of time of the wind based on an actual usage period of time and the design lifetime of the wind turbine; and determining the maximum design lifetime based on a ratio of a duration of the predetermined future period of time to the remaining usage period of time of the wind turbine multiplied by the remaining design lifetime of the wind turbine.

8. The method according to claim 2, wherein:

the historical operation data comprise at least one of fault data, a number of start/stop occurrences, or a duration of an idling state.

9. The non-transitory computer-readable storage medium according to claim 7, wherein the operations further comprise:

performing a fatigue load simulation on the wind turbine based on the historical wind resource data and historical operation data to obtain an equivalent fatigue load of at least one predefined key component of the wind turbine;

acquiring a consumed design lifetime of the at least one key component based on the equivalent fatigue load of the at least one key component and a design fatigue load of the at least one key component;

determining a consumed design lifetime of the wind turbine based on the consumed design lifetime of the at least one key component; and determining the remaining design lifetime of the wind turbine based on the design lifetime and the consumed design lifetime of the wind turbine.

10. The non-transitory computer-readable storage medium according to claim 7, wherein:

the wind resource data comprise a wind speed; or the wind resource data comprise the wind speed and at least one of turbulence intensity, wind shear, a wind direction, an inflow inclination angle, a wind frequency distribution, or an air density.

11. The non-transitory computer-readable storage medium according to claim 7, wherein the optimal output power corresponding to the at least one of the plurality of wind speed ranges is within a power output range of that wind speed range.

12. The method according to claim 1, wherein determining the optimal output power of the wind turbine comprises:
- setting an initial value of a set output power of the wind turbine in each of the plurality of wind speed ranges;
- a load calculation step of determining an equivalent load of the wind turbine in the predetermined future period of time based on the predicted wind resource data and the set output power corresponding to the at least one of the plurality of wind speed ranges, wherein a wind speed included in the predicted wind resource data falls within the at least one of the plurality of wind speed ranges;
- determining an estimated design lifetime of the wind turbine in the predetermined future period of time based on the equivalent load;
- determining whether an absolute value of a difference between the estimated design lifetime and the maximum design lifetime is less than a preset value;
- when the absolute value is less than the preset value, determining the optimal output power of the wind turbine to be the set output power in each of the plurality of wind speed ranges; and
- when the absolute value is equal to or greater than the preset value, updating the set output power and returning to the load calculation step.

13. The device according to claim 5, wherein the determination unit is configured to:
- set an initial value of a set output power of the wind turbine in each of the plurality of wind speed ranges;
- perform a load calculation step of determining an equivalent load of the wind turbine in the predetermined future period of time based on the predicted wind resource data and the set output power corresponding to the at least one of the plurality of wind speed ranges, wherein a wind speed included in the predicted wind resource data falls within the at least one of the plurality of wind speed ranges;
- determine an estimated design lifetime of the wind turbine in the predetermined future period of time based on the equivalent load;
- determine whether an absolute value of a difference between the estimated design lifetime and the maximum design lifetime is less than a preset value;
- when the absolute value is less than the preset value, determine the optimal output power of the wind turbine to be the set output power in each of the plurality of wind speed ranges; and
- when the absolute value is equal to or greater than the preset value, update the set output power and return to the load calculation step.

* * * * *